United States Patent

McMillan et al.

[15] 3,647,489

[45] Mar. 7, 1972

GLASS CERAMICS

[72] Inventors: Peter William McMillan; Graham Partridge, both of Stafford, England

[73] Assignee: The English Electric Company, Limited, London, England

[ * ] Notice: The portion of the term of this patent subsequent to Nov. 14, 1984, has been disclaimed.

[22] Filed: Aug. 13, 1969

[21] Appl. No.: 849,794

Related U.S. Application Data

[63] Continuation of Ser. No. 636,267, May 5, 1967, abandoned, Continuation-in-part of Ser. No. 552,422, May 24, 1966, abandoned, Continuation-in-part of Ser. No. 283,371, May 27, 1963, abandoned, Continuation-in-part of Ser. No. 201,718, June 11, 1962, abandoned.

[30] Foreign Application Priority Data

June 20, 1961 Great Britain......................22,232/61

[52] U.S. Cl..................................106/39 DV, 65/30, 65/33, 65/134

[51] Int. Cl....................................C04b 33/00, C03b 29/00

[58] Field of Search............................65/33, 30; 106/39 PV

[56] References Cited

UNITED STATES PATENTS

| | | | |
|---|---|---|---|
| 3,157,522 | 11/1964 | Stookey | 65/33 X |
| 3,117,881 | 1/1964 | Henry et al. | 65/33 X |
| 3,238,085 | 3/1966 | Kobe et al. | 65/33 X |
| 3,352,656 | 11/1967 | McMillan et al. | 65/33 X |

FOREIGN PATENTS OR APPLICATIONS

| | | | |
|---|---|---|---|
| 786,582 | 11/1957 | Great Britain | 65/33 |

OTHER PUBLICATIONS

Handbook of Glass Manufacture II, Pages 192 to 199.
J. Ceram. Assoc. Japan, No. 69, Mar. 1961, Pages 67, 74.
J. Ceram. Assoc. Japan, No. 70, Jan. 1962, pages 103 to 110.
Megumi Tashiro and Masamichi Wada, two pages, combined with Naohiro Soga, Sumio Sakka, and Megumi Tashiro three pages, making a five page brochure of an address or addresses presented at the VIth International Congress on Glass, Wash. DC, July 8–14, 1962.
The Glass Industry, Pages 76 to 82, Feb. 1964.

*Primary Examiner*—Frank W. Miga
*Attorney*—Stevens, Davis, Miller & Mosher

[57] ABSTRACT

A high-alumina glass-ceramic product with a substantial proportion microcrystalline is formed from a glass by thermal treatment, the main crystal phase being beta-spodumene or beta-eucryptite, and the product having a thermal coefficient of expansion of less than $40\times10^{-7}/°C$. At least 90 percent of the composition comprises major constituents and nucleating agents as follows, in percentages by weight:

Major constituents:

| | |
|---|---|
| $SiO_2$ | 55–75 |
| $Al_2O_3$ | 15–75 |
| $Li_2O$ | 2–15 |
| MgO | 0–20 |

Nucleating agents: $P_2O_5$, 0.5–6.0%, together with one of the following metallic oxides:

| | | |
|---|---|---|
| (a) | $MoO_3$ | 0.5–4.0 |
| (b) | $WO_3$ | 0.5–4.0 |
| (c) | $V_2O_5$ | 0.5–2.0 |
| (d) | $TiO_2$ | 0.2–less than 2. |

The thermal coefficient of expansion is less than $40\times10^{-7}$. An alternative nucleating agent is cadmium sulpho-selenide.

8 Claims, 8 Drawing Figures

GLASS CERAMICS

This application is a continuation of application Ser. No. 636,267 filed May 5 1967; that application was a continuation-in-part of application Ser. No. 552,422 filed May 24 1966; and that application was a continuation-in-part of applications Ser. Nos. 283,371 filed May 27 1963, and 201,718 filed June 11 1962; and all now abandoned.

The present invention relates to glass-ceramics.

A glass-ceramic is a material formed from a glass by heat treatment, the heat treatment being such as to induce crystallization and resulting in a very large number of microscopic crystals being formed. A nucleating agent is included in the glass to aid in the production of the large number of crystals. Such glass-ceramics are in general fairly hard, dense, and strong.

The object of the invention is to produce glass-ceramics having a desirable combination of properties. Among these properties are: a composition in the $SiO_2$-$Al_2O_3$-$Li_2O$ system; a low coefficient of thermal expansion; a high strength; and the absence of any special difficulties or disadvantages such as the need for special atmospheres during manufacture or the use of poisonous or otherwise undesirable materials.

The glass compositions used in the present invention have constituents in the following ranges, in percentages by weight:

| | |
|---|---|
| $SiO_2$ | 55–75 |
| $Al_2O_3$ | 15–30 |
| $Li_2O$ | 2–15 |
| MgO | 0–20. |

The nucleating agent used is a combination of two components: the first component is $P_2O_5$, 0.5–6.0 percent by weight, and the second component is one of the following metal oxides:

| | | |
|---|---|---|
| a. | $MoO_3$ | 0.5–4.0 |
| b. | $WO_3$ | 0.5–4.0 |
| c. | $V_2O_5$ | 0.5–2.0 |
| d. | $TiO_2$ | 0.2–less than 2. |

The main crystal phase which results is beta-spodumene or beta-eucryptite.

It has been known to use certain metal oxides, alone or in certain combinations, as nucleants for glasses of the above system. The most common nucleant is $TiO_2$. However, in U.S. Pat. No. 3,117,881, Henry et al. have proposed the use of $ZrO_2$ in combination with one of several other oxides as a nucleant. This specification gives the thermal coefficients of expansion of some of the resulting glass-ceramics as from 86 to $200\times10^{-7}/°C$; these values are much higher than those aimed at by the present invention, the lowest being more than twice the upper limit of the range achieved by the present invention. Also, in U.S. Pat. No. 3,238,085, Hayami et al. have proposed the use of $As_2O_3$ alone or together with $MoO_3$ or $WO_3$ as a nucleant. The use of arsenic obviously excludes the use of the resulting glass-ceramic for many purposes, e.g., domestic purposes.

It is known that $P_2O_5$ is an effective nucleant for certain silicate glasses, but it has been found that for glasses with more than, say, 10 percent of $Al_2O_3$, $P_2O_5$ is not an effective nucleant. However, it has now been found that $P_2O_5$, in combination with any of the metal oxides listed under (a) to (d) above, is effective as a nucleant for high-alumina glasses, and further that the resulting glass-ceramics have strengths very considerably greater than those obtainable by the use of metal oxide nucleants alone.

An alternative nucleating agent provided by this invention is cadmium sulpho-selenide.

Several examples of the preparation of glass-ceramics in accordance with the invention will now be given, by way of example, with reference to the accompanying drawings, in which.

Figure 1:
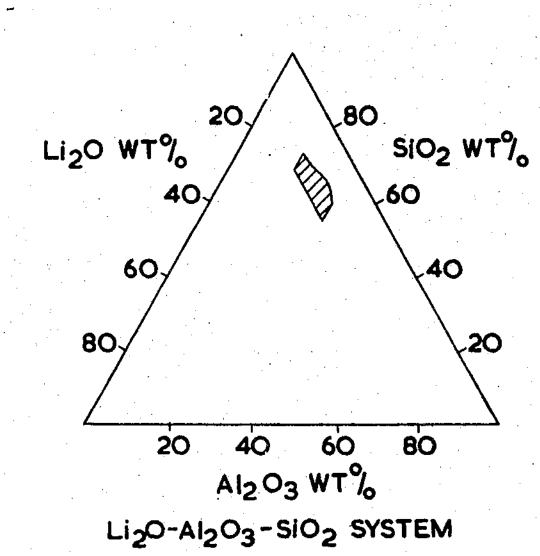
FIG. 1 is a 3-variable diagram showing the ranges of the major constituents in a $Li_2O$-$Al_2O_3$-$SiO_2$ system.

A mixture of raw materials to give the desired glass composition and incorporating the desired quantity of nucleating agent is melted at a temperature high enough to produce a bubble-free melt. As shown in FIG. 1 for the case where MgO is absent, and in FIGS. 2 to 6 for the cases where the proportion of $SiO_2$ has five special values between 55 percent and 75 percent by weight, the major constituents of the glass are, in percentages by weight:

| | |
|---|---|
| $SiO_2$ | 55–75 |
| $Al_2O_3$ | 15–30 |
| $Li_2O$ | 2–15 |
| MgO | 0–20. |

The nucleating agent consists of 0.5–6.0 percent of $P_2O_5$ together with one of the following metal oxides:

| | | |
|---|---|---|
| a. | $MoO_3$ | 0.5–4.0 |
| b. | $WO_3$ | 0.5–4.0 |
| c. | $V_2O_5$ | 0.5–2.0 |
| d. $TiO_2$ | | 0.2–less than 2. |

Figure 7:
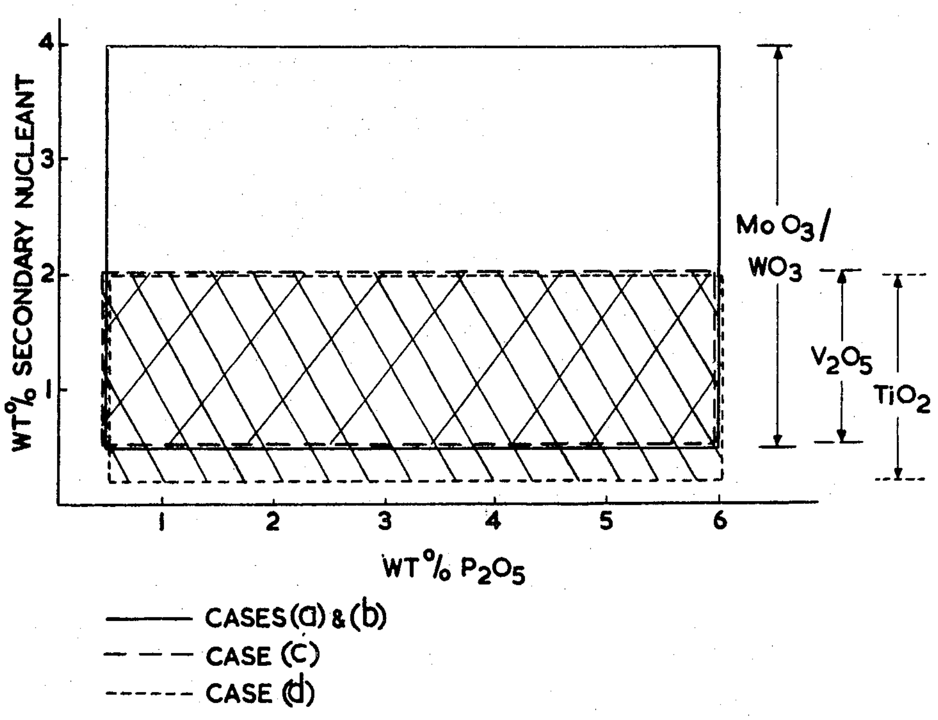
FIG. 7 is a diagram illustrating proportions of nucleants.
Figure 2:
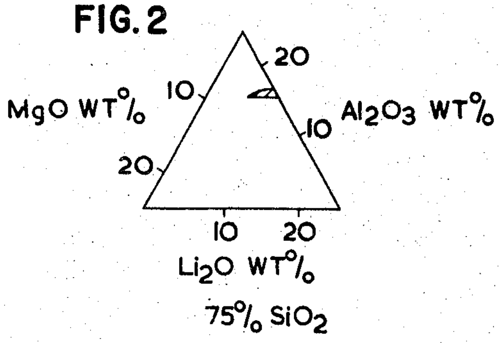
FIGS. 2 to 6 are is a series of 3-variable diagrams showing the ranges of the major constituents in a $Li_2O$-$Al_2O_3$-$SiO_2$-MgO system for five different proportions of $SiO_2$.
Figure 3:
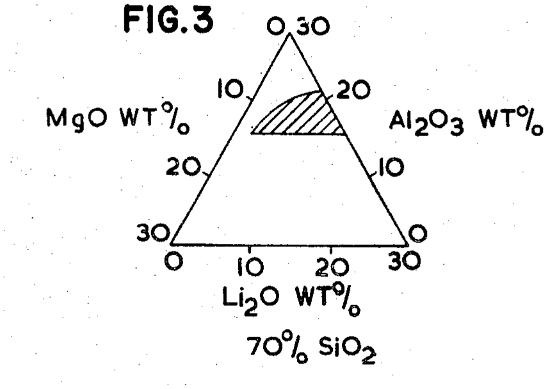
Figure 4:
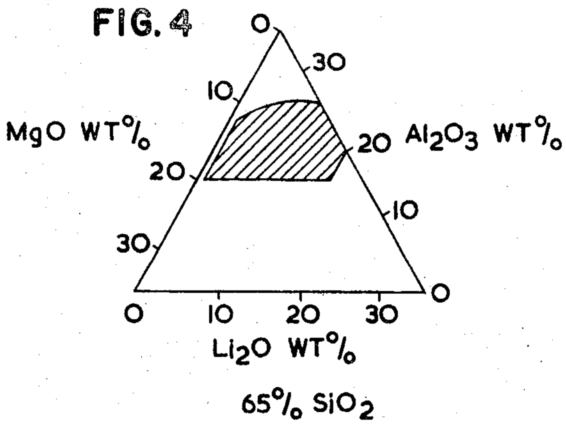
Figure 5:
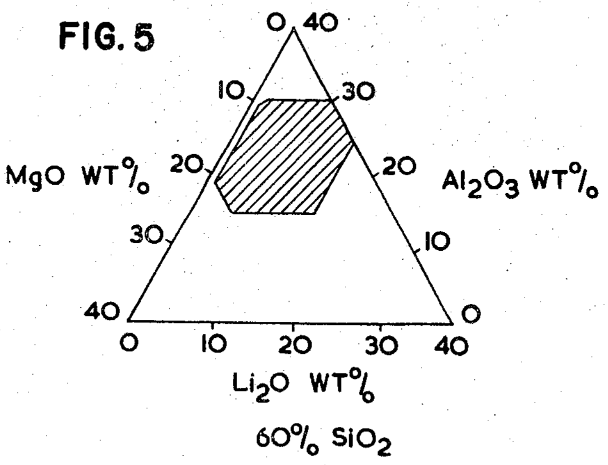
Figure 6:
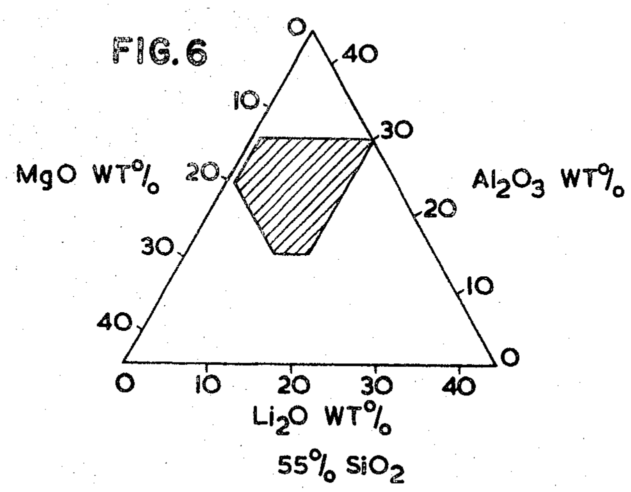

The proportions of the possible second nucleants (a) to (d) are plotted in FIG. 7 against that of $P_2O_5$.

the major constituents together with the desired proportion of nucleating agent should total at least 90 percent of the glass. The remaining 10 percent of the glass may be made up of various nonessential constituents some of which take part in the glassy matrix of the glass-ceramic together with residual $SiO_2$, $Al_2O_3$, $Li_2O$ and MgO. The nature of the optional minor constituents and the amounts in percentages by weight which are permissible are as follows:

i. alkali metal oxides ($Na_2O$ and $K_2O$) 0–5 either alone or combined, ii. zinc oxide (ZnO) 0–8.9, iii. calcium oxide (CaO) 0–5, iv. boric oxide ($B_2O_3$) 0–7.6.

The following batch materials may be used for the major constituents:

| | |
|---|---|
| Ground Quartz | $SiO_2$ |
| Aluminum Oxide | $Al_2O_3$ |
| Aluminum Hydroxide | $Al(OH)_3$ |
| Lithium Carbonate | $Li_2CO_3$ |
| Magnesium Oxide | MgO |

and for the minor constituents:

| | |
|---|---|
| Sodium Carbonate | $Na_2CO_3$ |
| Sodium Nitrate | $NaNO_3$ |
| Potassium Carbonate | $K_2CO_3$ |
| Potassium Nitrate | $KNO_3$ |
| Zinc Oxide | ZnO |
| Calcium Carbonate | $CaCO_3$ |
| Boric Acid | $H_3BO_3$. |

The batch materials are thoroughly mixed before melting. As a further constituent of the batch suitable quantities of the nucleating agents are added. These may conveniently be added to the batch in the forms of tungsten trioxide, molybdenum trioxide, vanadium pentoxide and/or titanium dioxide, together with phosphorus pentoxide, but other compounds of tungsten, molybdenum, vanadium and/or titanium together with for example an alkali metal phosphate may be used provided they are compatible with the glass structure. Such compounds include molybdates, tungstates, vanadates, and titanates of alkali metals.

As disclosed in Ser. No. 283,371, the batch material may contain cadmium-sulpho-selenide in an amount such as to give in the glass from 0.5–2.0 percent by weight of cadmium-sulpho-selenide either alone or with another nucleating agent.

The batch mixture is melted in crucibles at a temperature in the range 1,200°–1,500° C. depending on composition. The molten glass is then formed into the required shape by a normal glass-working process, such as casting or pressing.

If it is required to store the articles before devitrification they are annealed at a suitable temperature depending on the glass composition. For the controlled devitrification by heat treatment, the temperature of the articles is first raised at a rate not exceeding 10° C. per minute, and preferably at between 3° C. and 5° C. per minute to a nucleation temperature which is preferably between the softening point (mg. point) of the glass and a value 50° C. above the softening point. The nucleation temperature is usually in the range 600°–700° C. for these glass compositions.

If however it is not required to store the articles, they are transferred direct, at the temperature which they have reached after working, to a furnace maintained at the nucleation temperature. In either case the articles are maintained at the nucleation temperature for a period which depends on the glass composition and which may be as short as 2 minutes but may be 2 hours or longer. This treatment causes the formation of nuclei dispersed through the glass.

The temperature is then further raised at a rate not exceeding 10° C. per minute to the final crystallization temperature, which varies from approximately 700° to 1,250° C. depending on the composition, and is usually in the range 950° 1,100° C. This temperature is maintained for a period of not less than 15 minutes and preferably for at least 2 hours, again depending on the composition, and during this stage the crystallization occurs and a dense glass-ceramic product containing closely interlocking crystals is obtained. The articles are then allowed to cool at a rate not exceeding 10° C. per minute, the normal cooling rate of the furnace usually being satisfactory.

Specific examples of the process will now be described:

Mixtures of raw materials to give glasses of each of the compositions indicated in percentages by weight in Tables IA to IH were melted in malachite-type crucibles.

The glasses were then shaped to produce the desired article by normal glass-working processes, such as casting or pressing.

Figure 8:
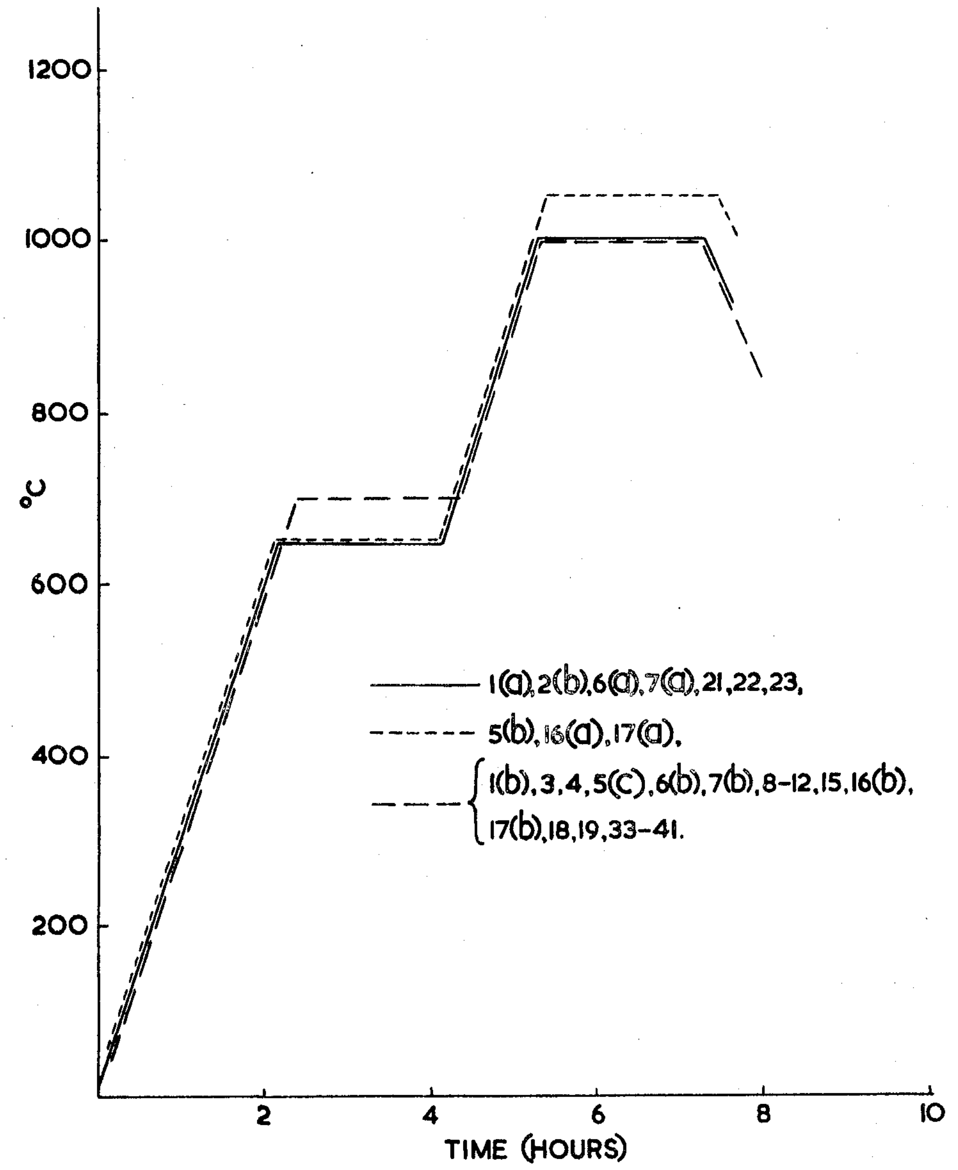
FIG. 8 is a time-temperature diagram illustrating heat treatments.

Samples of the glass compositions were then heat-treated as shown in Tables IIA to IIF. The temperature of each sample was raised at a rate not exceeding 10° C. per minute to the temperature specified in the first line of the Tables, and this temperature was maintained for the time specified in the second line. The temperature was then raised at a rate not exceeding 10° C. per minute to the temperature specified in the third line of the Tables, and this temperature was maintained for the time specified in the fourth line, after which the temperature of the samples was reduced at not more than 10° C. per minute to room temperature. FIG. 8 shows the time-temperature relationships for the two-stage heat treatment, using the compositions indicated on the Figure.

TABLE IA

| | Composition No. | | | | | |
|---|---|---|---|---|---|---|
| | 1. | 2. | 3. | 4. | 5. | 6. |
| $SiO_2$ | 61.0 | 61.7 | 62.5 | 62.4 | 65.1 | 62.6 |
| $Al_2O_3$ | 18.2 | 18.5 | 18.5 | 18.7 | 19.3 | 18.7 |
| $Li_2O$ | 5.6 | 5.7 | 5.7 | 5.7 | 5.8 | 5.7 |
| MgO | — | — | — | — | 2.7 | — |
| $K_2O$ | 4.1 | 4.2 | 4.2 | 4.2 | 4.5 | 4.2 |
| $Na_2O$ | — | — | — | — | — | — |
| ZnO | 5.2 | 5.3 | 5.3 | 5.3 | — | 5.3 |
| CaO | — | — | — | — | — | — |
| $B_2O_3$ | — | — | — | — | — | — |
| $P_2O_5$ | 2.4 | 2.4 | 2.4 | 2.4 | 1.4 | 2.4 |
| $MoO_3$ | — | | 2.2 | — | 1.2 | 1.1 |
| $WO_3$ | 3.5 | — | — | — | — | — |
| $V_2O_5$ | — | — | 1.4 | — | — | — |
| $TiO_2$ | — | — | — | 1.3 | — | — |

TABLE IB

| | Composition No. | | | | | |
|---|---|---|---|---|---|---|
| | 7. | 8. | 9. | 10. | 11. | 12. |
| $SiO_2$ | 62.2 | 63.2 | 63.4 | 63.4 | 62.9 | 63.3 |
| $Al_2O_3$ | 18.5 | 18.7 | 18.8 | 18.8 | 18.9 | 18.8 |
| $Li_2O$ | 5.7 | 5.7 | 5.7 | 5.7 | 5.7 | 5.7 |
| MgO | — | — | — | — | — | — |
| $K_2O$ | 4.2 | 4.3 | 4.3 | 4.3 | 4.3 | 4.3 |
| $Na_2O$ | — | — | — | — | — | — |
| ZnO | 5.2 | 5.3 | 5.2 | 5.2 | 5.3 | 5.3 |
| CaO | — | — | — | — | — | — |
| $B_2O_3$ | — | — | — | — | — | — |
| $P_2O_5$ | 2.4 | 2.4 | 2.1 | 2.1 | 2.4 | 2.4 |
| $MoO_3$ | — | — | 0.5 | — | — | — |
| $WO_3$ | 1.8 | 0.4 | — | — | — | — |
| $V_2O_5$ | — | — | — | 0.5 | — | — |
| $TiO_2$ | — | — | — | — | 0.5 | 0.2 |

TABLE IC

| | Composition No. | | | | | |
|---|---|---|---|---|---|---|
| | 13. | 14. | 15. | 16. | 17. | 18. |
| $SiO_2$ | 64.1 | 63.6 | 65.3 | 64.5 | 61.9 | 61.2 |
| $Al_2O_3$ | 19.3 | 19.1 | 19.5 | 19.3 | 18.9 | 18.7 |
| $Li_2O$ | 5.8 | 5.8 | 5.9 | 5.8 | 5.5 | 5.5 |
| MgO | 2.7 | 2.7 | 2.7 | 2.7 | — | — |
| $K_2O$ | 4.5 | 4.5 | 4.6 | 4.5 | 2.9 | 2.9 |
| $Na_2O$ | — | — | — | — | — | — |
| ZnO | — | — | — | — | 8.9 | 8.6 |
| CaO | — | — | — | — | — | — |
| $B_2O_3$ | — | — | — | — | — | — |
| $P_2O_5$ | 2.5 | 2.5 | 1.4 | 1.4 | 1.3 | 1.3 |
| $MoO_3$ | 1.1 | — | — | — | — | — |
| $WO_3$ | — | 1.8 | — | 1.8 | — | 1.8 |
| $V_2O_5$ | — | — | — | — | — | — |
| $TiO_2$ | — | — | 0.6 | — | 0.6 | — |

TABLE ID

| | Composition No. | | | | | |
|---|---|---|---|---|---|---|
| | 19. | 20. | 21. | 22. | 23. | 24. |
| $SiO_2$ | 61.6 | 62.0 | 61.2 | 62.1 | 60.6 | 61.7 |
| $Al_2O_3$ | 18.8 | 18.5 | 18.3 | 18.7 | 18.1 | 18.3 |
| $Li_2O$ | 5.5 | 5.7 | 5.4 | 5.5 | 5.1 | 4.9 |
| MgO | — | — | — | — | — | — |
| $K_2O$ | 2.9 | 2.2 | 4.2 | 4.2 | 4.2 | 4.2 |
| $Na_2O$ | — | — | — | — | — | — |
| ZnO | 8.8 | 7.0 | 5.2 | 5.3 | 5.2 | 5.2 |
| CaO | — | — | — | — | — | — |
| $B_2O_3$ | — | — | — | — | — | — |
| $P_2O_5$ | 1.3 | 2.4 | 2.4 | 2.4 | 2.8 | 2.4 |
| $MoO_3$ | 1.1 | 2.2 | 3.3 | — | 4.0 | 3.3 |
| $WO_3$ | — | — | — | — | — | — |
| $V_2O_5$ | — | — | — | — | — | — |
| $TiO_2$ | — | — | — | 1.8 | — | — |

TABLE IE

| | Composition No. | | | | | |
|---|---|---|---|---|---|---|
| | 25. | 26. | 27. | 28. | 29. | 30. |
| $SiO_2$ | 62.4 | 63.0 | 63.6 | 61.2 | 61.3 | 62.2 |
| $Al_2O_3$ | 18.2 | 18.1 | 18.1 | 18.4 | 18.4 | 18.6 |
| $Li_2O$ | 4.4 | 4.0 | 3.5 | 5.4 | 5.4 | 5.4 |
| MgO | — | — | — | — | — | — |
| $K_2O$ | 4.1 | 4.0 | 4.1 | 3.6 | 2.9 | 2.9 |
| $Na_2O$ | — | — | — | — | — | — |
| ZnO | 5.2 | 5.2 | 5.2 | 5.7 | 6.3 | 5.2 |
| CaO | — | — | — | — | — | — |
| $B_2O_3$ | — | — | — | — | — | — |
| $P_2O_5$ | 2.4 | 2.4 | 2.3 | 2.4 | 2.4 | 2.4 |
| $MoO_3$ | 3.3 | 3.3 | 3.2 | 3.3 | 3.3 | 3.3 |

| | | | | | | |
|---|---|---|---|---|---|---|
| $WO_3$ | — | — | — | — | — | — |
| $V_2O_5$ | — | — | — | — | — | — |
| $TiO_2$ | — | — | — | — | — | — |

TABLE IF

| | Composition No. 31. | 32. | 33. | 34. | 35. | 36. |
|---|---|---|---|---|---|---|
| $SiO_2$ | 61.1 | 60.7 | 71.0 | 55.0 | 56.0 | 62.4 |
| $Al_2O_3$ | 18.3 | 18.3 | 15.0 | 26.0 | 20.0 | 19.0 |
| $Li_2O$ | 5.4 | 5.4 | 5.0 | 12.0 | 12.5 | 6.0 |
| MgO | — | — | — | — | 1.0 | 4.5 |
| $K_2O$ | 4.2 | 4.2 | 3.0 | — | 3.0 | 4.5 |
| $Na_2O$ | — | — | — | — | — | — |
| ZnO | 5.2 | 5.2 | — | — | — | — |
| CaO | — | — | — | — | — | — |
| $B_2O_3$ | 0.1 | 0.5 | — | — | — | — |
| $P_2O_5$ | 2.4 | 2.4 | 3.0 | 4.0 | 5.5 | 2.5 |
| $MoO_3$ | 3.3 | 3.3 | 3.0 | 3.0 | 3.0 | 1.1 |
| $WO_3$ | — | — | — | — | — | — |
| $V_2O_5$ | — | — | — | — | — | — |
| $TiO_2$ | — | — | — | — | — | — |

TABLE IG

| | Composition No. 37. | 38. | 39. | 40. | 41. | 42. |
|---|---|---|---|---|---|---|
| $SiO_2$ | 58.0 | 66.8 | 62.8 | 62.1 | 63.5 | 80.5 |
| $Al_2O_3$a | 15.0 | 18.9 | 18.9 | 18.7 | 18.8 | 4.0 |
| $Li_2O$ | 4.0 | 5.7 | 5.7 | 5.5 | 5.8 | 12.5 |
| MgO | 16.0 | — | — | — | — | — |
| $K_2O$ | 1.0 | 2.3 | 4.3 | 4.2 | 4.3 | 2.5 |
| $Na_2O$ | — | — | — | — | — | — |
| ZnO | — | 3.3 | 5.3 | 5.3 | 5.3 | — |
| CaO | — | — | — | — | — | — |
| $B_2O_3$ | — | — | — | — | — | — |
| $P_2O_5$ | 3.0 | 2.4 | 2.4 | 2.4 | 0.5 | — |
| $MoO_3$ | 3.0 | 0.6 | — | — | — | — |
| $WO_3$ | — | — | — | — | — | — |
| $V_2O_5$ | — | — | 0.6 | 1.8 | 1.8 | — |
| $TiO_2$ | — | — | — | — | — | — |
| Cd(S.Se) | — | — | — | — | — | 0.5 |

TABLE IH

| | Composition No. 43. | 44. | 45. | 46. |
|---|---|---|---|---|
| $SiO_2$ | 79.0 | 73.5 | 73.5 | 73.5 |
| $Al_2O_3$a | 4.0 | 10.0 | 10.0 | 10.0 |
| $Li_2O$ | 12.5 | 12.5 | 12.5 | 12.5 |
| MgO | — | — | — | — |
| $K_2O$ | 2.5 | 3.5 | 3.0 | 2.0 |
| $Na_2O$ | — | — | — | — |
| ZnO | — | — | — | — |
| CaO | — | — | — | — |
| $B_2O_3$ | — | — | — | — |
| $P_2O_5$ | — | — | — | — |
| $MoO_3$ | — | — | — | — |
| $WO_3$ | — | — | — | — |
| $V_2O_5$ | — | — | — | — |
| $TiO_2$ | — | — | — | — |
| Cd(S.Se) | 2.0 | 0.5 | 1.0 | 2.0 |

TABLE IIA

| | Composition No. | | | | | | | | | |
|---|---|---|---|---|---|---|---|---|---|---|
| | 1(a) | 2(b) | 2(a) | 2(b) | 3 | 4 | 5(a) | 5(b) | 5(c) | 5(d) |
| Heat-treatment: | | | | | | | | | | |
| 1st stage: | | | | | | | | | | |
| Temperature, ° C. | 650 | 700 | 600 | 650 | 700 | 700 | 700 | 650 | 700 | 700 |
| Time, hours | 2 | 2 | 2 | 2 | 2 | 2 | 2 | 2 | 2 | 4 |
| 2nd stage: | | | | | | | | | | |
| Temperature, ° C. | 1,000 | 1,000 | 950 | 1,000 | 1,000 | 1,000 | 1,050 | 1,050 | 1,000 | 1,000 |
| Time, hours | 2 | 2 | 2 | 2 | 2 | 2 | 2 | 2 | 2 | ¼ |
| Properties of glass-ceramic: | | | | | | | | | | |
| Modulus of rupture p.s.i.$\times 10^{-3}$ | 16.2 | 12.5 | 14.2 | 12.0 | | 16.9 | | | 12.0 | |
| Expansion coeff. per ° C.$\times 10^7$ (20–500° C.) | 22.0 | 20.6 | 25.9 | 22.0 | 23.0 | 15.4 | 32.2 | 15.5 | 13.1 | 2.5 |
| Main crystal phase in glass-ceramic | (1) | (1) | | | (2) | | | | | |

[1] Beta spodumene. [2] Beta eucryptite.

TABLE IIB

| | Composition No. | | | | | | | | | |
|---|---|---|---|---|---|---|---|---|---|---|
| | 6(a) | 6(b) | 7(a) | 7(b) | 8 | 9 | 10 | 11 | 12 | 13(a) |
| Heat-treatment: | | | | | | | | | | |
| 1st stage: | | | | | | | | | | |
| Temperature, ° C. | 650 | 700 | 650 | 700 | 700 | 700 | 700 | 700 | 700 | 700 |
| Time, hours | 2 | 2 | 2 | 2 | 2 | 2 | 2 | 2 | 2 | 2 |
| 2nd stage: | | | | | | | | | | |
| Temperature, ° C. | 1,000 | 1,000 | 1,000 | 1,000 | 1,000 | 1,000 | 1,000 | 1,000 | 1,000 | 1,050 |
| Time, hours | 2 | 2 | 2 | 2 | 2 | 2 | 2 | 2 | 2 | 2 |
| Properties of glass-ceramic: | | | | | | | | | | |
| Modulus of rupture p.s.i.$\times 10^{-3}$ | 19.9 | | | 13.0 | 12.0 | | | 24.8 | | 14.5 |
| Expansion coeff. per ° C.$\times 10^7$ (20–500° C.) | 26.2 | 20.2 | 31.1 | 18.3 | 23.3 | 22.6 | 4.6 | 24.7 | 16.8 | 28.0 |
| Main crystal phase in glass-ceramic | (1) | (1) | | | | | | | | |

[1] Beta spodumene.

TABLE IIC

| | Composition No. | | | | | | | | | |
|---|---|---|---|---|---|---|---|---|---|---|
| | 13(b) | 14 | 15 | 16(a) | 16(b) | 16(c) | 17(a) | 17(b) | 18 | 19 |
| Heat-treatment: | | | | | | | | | | |
| 1st stage: | | | | | | | | | | |
| Temperature, ° C | 700 | 700 | 700 | 650 | 700 | 700 | 650 | 700 | 700 | 700 |
| Time, hours | 20 | 2 | 2 | 2 | 2 | 4 | 2 | 2 | 2 | 2 |
| 2nd stage: | | | | | | | | | | |
| Temperature, ° C | 1,000 | 1,050 | 1,000 | 1,050 | 1,000 | 1,000 | 1,050 | 1,000 | 1,000 | 1,000 |
| Time, hours | ¼ | 2 | 2 | 2 | 2 | ¼ | 2 | 2 | 2 | 2 |
| Properties of glass-ceramic: | | | | | | | | | | |
| Modulus of rupture p.s.i.×10⁻³ | | | | | 11.5 | | | | | |
| Expansion coeff. per ° C.×10⁷ (20–500° C.) | 14.2 | 26.6 | 24.2 | 7.5 | 6.7 | 13.1 | 5.4 | 2.2 | 13.4 | 14.9 |
| Main crystal phase in glass ceramic | | | | (1) | (1) | (1) | (1) | (1) | | |

1 Beta eucryptite.

TABLE IID

| | Composition No. | | | | | | | | | |
|---|---|---|---|---|---|---|---|---|---|---|
| | 20 | 21 | 22 | 23 | 24(a) | 24(b) | 25(a) | 25(b) | 26 | 27(a) |
| Heat-treatment: | | | | | | | | | | |
| 1st stage: | | | | | | | | | | |
| Temperature, ° C | 700 | 650 | 650 | 650 | 650 | 680 | 650 | 680 | 700 | 650 |
| Time, hours | 2 | 2 | 2 | 2 | 3 | 3 | 3 | 3 | 3 | 3 |
| 2nd stage: | | | | | | | | | | |
| Temperature, ° C | 1,050 | 1,000 | 1,000 | 1,000 | 1,000 | 1,000 | 1,000 | 1,000 | 1,075 | 1,000 |
| Time, hours | 15 | 2 | 2 | 2 | 1 | 1 | 1 | 1 | 1 | 1 |
| Properties of glass-ceramic: | | | | | | | | | | |
| Modulus of rupture p.s.i.×10⁻³ | 10 | 15.6 | | 12.5 | 20.0 | 19.4 | | 10.0 | | |
| Expansion coeff. per ° C.×10⁷ (20–500° C.) | 1.2 | 19.0 | 9.2 | 15.4 | 24.2 | | 23.3 | | 14.5 | 19.2 |
| Main crystal phase in glass-ceramic | | | (1) | | | | | | | |

1 Betaeucryptite.

TABLE IIE

| | Composition No. | | | | | | | | | |
|---|---|---|---|---|---|---|---|---|---|---|
| | 27(b) | 28 | 29 | 30 | 31 | 32 | 33 | 34 | 35 | 36 |
| Heat-treatment: | | | | | | | | | | |
| 1st stage: | | | | | | | | | | |
| Temperature, ° C | 700 | 650 | 600 | 700 | 700 | 700 | 700 | 700 | 700 | 700 |
| Time, hours | 3 | 3 | 3 | 3 | 1 | 1 | 2 | 2 | 2 | 2 |
| 2nd stage: | | | | | | | | | | |
| Temperature, ° C | 1,075 | 1,000 | 1,000 | 1,075 | 1,000 | 1,000 | 1,000 | 1,000 | 1,000 | 1,000 |
| Time, hours | 1 | 1 | 1 | 1 | 2¼ | 2¼ | 2 | 2 | 2 | 2 |
| Properties of glass-ceramic: | | | | | | | | | | |
| Modulus of rupture p.s.i.×10⁻³ | | 15.7 | | 18.1 | 12.2 | 13.4 | | | | |
| Expansion coeff. per ° C.×10⁷ (20–500° C.) | 11.0 | 20.4 | 12.0 | | | | −7.7 | −6.9 | 29.0 | 10.5 |
| Main crystal phase in glass-ceramic | | | | | | | (1) | (1) | (2) | (2) |

1 Beta eucryptite/quartz solid solutions.
2 Beta spodumene/quartz solid solutions.

TABLE IIF

| | Composition No. | | | | |
|---|---|---|---|---|---|
| | 37 | 38 | 39 | 40 | 41 |
| Heat-treatment: | | | | | |
| 1st stage: | | | | | |
| Temperature, ° C | 700 | 700 | 700 | 700 | 700 |
| Time, hours | 2 | 2 | 2 | 2 | 2 |
| 2nd stage: | | | | | |
| Temperature, ° C | 1,000 | 1,000 | 1,000 | 1,000 | 1,000 |
| Time, hours | 2 | 2 | 2 | 2 | 2 |
| Properties of glass-ceramic: | | | | | |
| Modulus of rupture p.s.i.×100³ | | | | | |
| Expansion coeff. per ° C.×10⁷ (20–500° C.) | 21.9 | −6.2 | −2.0 | −4.6 | 11.8 |
| Main crystal phase in glass-ceramic | (1) | | | | |

1 Beta spodumene/quartz solid solutions.

It was found that the samples had been converted into microcrystalline ceramics of good mechanical strengths with the moduli of rupture and with the linear thermal expansion coefficients in the range 20°–500° C. as given in the fifth and sixth lines of Tables IIA to IIF.

The glass-ceramics thus prepared were found to have finer crystalline structures and to be mechanically stronger than otherwise similar glass-ceramics using phosphates alone to serve as nucleating agents.

The ceramic materials resulting from controlled devitrification in this manner are colored as follows:

incorporating molybdenum: pale buff to pale yellow
incorporating tungsten: pale greyish violet
incorporating vanadium: grey to grey brown
incorporating titanium: pale violet.

We claim:

1. A hard, dense, mechanically strong, electrically insulating, high-alumina glass-ceramic product of which at least a substantial proportion is microcrystalline, consisting essentially of a composition having major constituents and nucleating agents which together form at least 90 percent by weight of the composition, said major constituents consisting of $SiO_2$, $Al_2O_3$, $Li_2O$, and optionally MgO within the following ranges in percentages by weight:

| | |
|---|---|
| $SiO_2$ | 55–75 |
| $Al_2O_3$ | 15–30 |
| $Li_2O$ | 2–15 |
| MgO | 0–20, |

and said nucleating agents consisting of 0.5– 6.0 percent by weight of $P_2O_5$ together with any of the following, in percentages by weight,

| | | |
|---|---|---|
| a. | $MoO_3$ | 0.5–4.0 |
| b. | $WO_3$ | 0.5—4.0 |
| c. | $V_2O_5$ | 0.5–2.0 |
| d. | $TiO_2$ | 0.2–less than 2, |

said product having its main crystal phase selected from the group consisting of beta-spodumene and beta-eucryptite, and having a coefficient of thermal expansion of less than 40 × $10^{-7}$.

2. A glass-ceramic product as claimed in claim 1 containing as optional minor constituents, up to a total of not more than 10 percent by weight, any of the following, in percentages by weight:

| | | |
|---|---|---|
| i. | $Na_2O$ and $K_2O$ together | 0–5 |
| ii. | ZnO | 0—8.9 |
| iii. | CaO | 0–5.0 |
| iv. | $B_2O_3$ | 0–7.6. |

3. A glass-ceramic material formed by devitrification of a glass consisting of major constituents which, together with a nucleating agent, make up at least 90 percent by weight of the total composition and lie in the glass system consisting essentially of:

| | |
|---|---|
| $SiO_2$ | 45–88% |
| $Al_2O_3$ | 0—36% |
| $Li_2O$ | 0—27% |
| MgO | 0—32% |

optional minor constituents consisting essentially of alkali metal oxides 0–5 percent; zinc oxide 0–8.9 percent; calcium oxide 0–5 percent; and boric oxide 0–10 percent; and a nucleating agent being cadmium-sulpho-selenide 0.5–2.0 percent by weight.

4. A hard, dense, mechanically strong, high-alumina glass-ceramic product of which at least a substantial proportion is microcrystalline, consisting essentially of a composition having major constituents and a nucleating agent which together form at least 90 percent of the composition, said major constituents consisting of $SiO_2$, $Al_2O_3$, $Li_2O$ and optionally of MgO within the following ranges in percentages by weight:

| | |
|---|---|
| $SiO_2$ | 55–75 |
| $Al_2O_3$ | 15–30 |
| $Li_2O$ | 2–15 |
| MgO | 0–20 |

and said composition containing as nucleating agent the combination of $P_2O_5$ and $TiO_2$ within the following ranges in percentages by weight:

| | |
|---|---|
| $P_2O_5$ | 0.5–6.0 |
| $TiO_2$ | 0.2–less than 2 |

said product having its main crystal phase selected from the group consisting of beta-spodumene and beta-eucryptite, and having a coefficient of thermal expansion of less than $25\times 10^{-7}$.

5. A glass-ceramic product as claimed in claim 4 containing as optional minor constituents, up to a total of not more than 10 percent, any of the following in the stated percentages by weight:

i. $Na_2O$ and $K_2O$ 0 – 5, but not exceeding 5 percent in combined total, ii. ZnO 0 – 8.9 iii. CaO – 5.0 iv. $B_2O_3$ — – 7.6.

6. A hard, dense, mechanically strong, high-alumina glass-ceramic product of which at least a substantial proportion is microcrystalline, consisting essentially of a composition having major constituents and a nucleating agent which together form at least 90 percent of the composition, said major constituents consisting of $SiO_2$, $Al_2O_3$, $Li_2O$ and optionally MgO within the following ranges in percentages by weight:

| | |
|---|---|
| $SiO_2$ | 55–75 |
| $Al_2O_3$ | 15–30 |
| $Li_2O$ | 2–15 |
| MgO | 0–20 |

and said composition containing as nucleating agent the combination of $P_2O_5$ and $V_2O_5$ within the following ranges in percentages by weight:

| | |
|---|---|
| $P_2O_5$ | 0.5—6.0 |
| $V_2O_5$ | 0.5–2.0 |

said product having its main crystal phase selected from the group consisting of beta-spodumene and beta-eucryptite, and having a coefficient of thermal expansion of less than $25\times 10^{-7}$.

7. A glass-ceramic product as claimed in claim 1 wherein said $TiO_2$ is present in the range 0.2 – 1.5 percent.

8. A glass-ceramic product as claimed in claim 4 wherein said $TiO_2$ is present in the range 0 .2 – 1.5 percent.

* * * * *